United States Patent
Sreeramagiri et al.

(10) Patent No.: US 12,024,589 B2
(45) Date of Patent: Jul. 2, 2024

(54) METHOD OF PREPARING A POLY (PHENYLENE ETHER), POLY(PHENYLENE ETHER) MADE THEREBY, AND ARTICLE COMPRISING THE POLY(PHENYLENE ETHER)

(71) Applicant: SHPP GLOBAL TECHNOLOGIES B.V., Bergen op Zoom (NL)

(72) Inventors: Sivakumar Sreeramagiri, Bangalore (IN); Samir Anapat, Bangalore (IN); Rajesh Chowdhury, Bangalore (IN); Ravinath Manchana, Bangalore (IN); Bhanu Kiran Vankayala, Bangalore (IN); Shweta Hegde, Bangalore (IN); Ramesh Narayana, Bangalore (IN); Yogesha Subbaiah, Bangalore (IN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 664 days.

(21) Appl. No.: 17/285,158

(22) PCT Filed: Oct. 10, 2019

(86) PCT No.: PCT/IB2019/058661
§ 371 (c)(1),
(2) Date: Apr. 14, 2021

(87) PCT Pub. No.: WO2020/079544
PCT Pub. Date: Apr. 23, 2020

(65) Prior Publication Data
US 2021/0347944 A1    Nov. 11, 2021

(30) Foreign Application Priority Data
Oct. 18, 2018 (EP) ..................... 18201167

(51) Int. Cl.
*G01N 21/35* (2014.01)
*C08G 65/44* (2006.01)

(52) U.S. Cl.
CPC ............. *C08G 65/44* (2013.01); *G01N 21/35* (2013.01)

(58) Field of Classification Search
USPC .......................................... 528/215
See application file for complete search history.

(56) References Cited

U.S. PATENT DOCUMENTS

| | | | |
|---|---|---|---|
| 3,306,874 A * | 2/1967 | Hay | ........ C08G 65/44 528/215 |
| 3,306,875 A * | 2/1967 | Hay | ........ C07C 37/07 568/636 |
| 3,384,619 A | 5/1968 | Hori et al. | |
| 3,639,656 A | 2/1972 | Bennett et al. | |
| 3,642,699 A | 2/1972 | Cooper et al. | |
| 3,661,848 A | 5/1972 | Cooper et al. | |
| 3,733,299 A | 5/1973 | Cooper | |
| 3,838,102 A | 9/1974 | Bennett et al. | |
| 3,914,266 A | 10/1975 | Hay | |
| 3,951,917 A | 4/1976 | Floryan et al. | |
| 4,028,341 A * | 6/1977 | Hay | ........ C08G 65/44 528/215 |
| 4,039,510 A | 8/1977 | Cooper et al. | |
| 4,054,553 A | 10/1977 | Olander | |
| 4,092,294 A | 5/1978 | Bennett, Jr. et al. | |
| 4,477,649 A | 10/1984 | Mobley | |
| 4,477,650 A | 10/1984 | Mobley | |
| 4,556,699 A | 12/1985 | Bialy et al. | |
| 4,578,449 A * | 3/1986 | Mobley | ........ C08G 65/44 528/214 |
| 4,675,377 A | 6/1987 | Mobley et al. | |
| 4,696,996 A | 9/1987 | Brandt et al. | |
| 4,705,843 A | 11/1987 | Stammann et al. | |
| 4,788,277 A | 11/1988 | Ibe et al. | |
| 5,599,510 A | 2/1997 | Kaminsky et al. | |
| 6,472,499 B1 | 10/2002 | Braat et al. | |
| 6,586,567 B2 | 7/2003 | Takeda et al. | |
| 7,541,421 B2 | 6/2009 | Carrillo et al. | |
| 8,025,158 B2 | 9/2011 | Delsman et al. | |
| 8,215,495 B2 | 6/2012 | Delsman et al. | |

(Continued)

FOREIGN PATENT DOCUMENTS

| | | |
|---|---|---|
| CN | 101899150 A | 12/2010 |
| EP | 0103154 A1 | 3/1984 |

(Continued)

OTHER PUBLICATIONS

International Search Report for the corresponding International Application No. PCT/IB2019/058661, International Filing Date: Oct. 10, 2019; Date of Mailing: Feb. 11, 2020; 8 pages.

(Continued)

*Primary Examiner* — Terressa Boykin
(74) *Attorney, Agent, or Firm* — CANTOR COLBURN LLP (57) ABSTRACT

A method for preparing a poly(phenylene ether) includes feeding an oxygen-containing gas phase to a single continuous flow reactor containing a reaction mixture, and oxidatively polymerizing the reaction mixture to form a poly(phenylene ether) in the single reactor. The reaction mixture includes a phenol, a transition metal catalyst, and an organic solvent. A poly(phenylene ether) made by the method and articles including the poly(phenylene ether) are also disclosed. Methods for quantifying phenol concentration and poly(phenylene ether) molecular weight in the reaction mixture are also discussed.

16 Claims, 2 Drawing Sheets

(56) References Cited

U.S. PATENT DOCUMENTS

| | | |
|---|---|---|
| 8,507,636 B2 | 8/2013 | Delsman et al. |
| 10,017,457 B2 | 7/2018 | Ma et al. |
| 2008/0033141 A1 | 2/2008 | Bates et al. |
| 2009/0211967 A1 | 8/2009 | Delsman et al. |
| 2018/0079863 A1 | 3/2018 | Ghanta |
| 2020/0231750 A1 | 7/2020 | Sreeramagiri et al. |

FOREIGN PATENT DOCUMENTS

| | | |
|---|---|---|
| EP | 0179314 A1 | 4/1986 |
| EP | 0194584 A1 | 9/1986 |
| EP | 0197469 A2 | 10/1986 |
| EP | 1439209 A1 | 7/2004 |
| EP | 1832617 A2 | 9/2007 |
| GB | 1333511 A | 10/1973 |
| JP | H0710985 A | 1/1995 |
| JP | H10212350 A | 8/1998 |
| WO | 2006083250 A1 | 8/2006 |
| WO | 2017105782 A1 | 6/2017 |

OTHER PUBLICATIONS

Written Opinion for the corresponding International Application No. PCT/IB2019/058661, International Filing Date: Oct. 10, 2019; Date of Mailing: Feb. 11, 2020; 9 pages.

* cited by examiner

METHOD OF PREPARING A POLY (PHENYLENE ETHER), POLY(PHENYLENE ETHER) MADE THEREBY, AND ARTICLE COMPRISING THE POLY(PHENYLENE ETHER)

CROSS-REFERENCE TO RELATED APPLICATIONS

This application is a National Stage application of PCT/IB2019/058661, filed Oct. 10, 2019, which claims priority to EP 18201167.6, filed Oct. 18, 2018, both of which are incorporated herein by reference in their entirety.

BACKGROUND

Poly(phenylene ether)s constitute a family of engineering thermoplastics that are highly regarded for their chemical and physical properties. Poly(phenylene ether)s can be prepared by the oxidative coupling of a phenol with oxygen in the presence of a catalyst (e.g., a copper-amine catalyst). Typical preparation of poly(phenylene ether)s is based on batch processes. Batch operation can suffer from limitations including variation in batch to batch product quality. There accordingly remains a need in the art for an improved process for preparation of poly(phenylene ether)s capable of providing a polymer product with decreased reaction times. It would be further desirable to provide a polymer product having a high molecular weight and a narrow molecular weight distribution.

BRIEF DESCRIPTION

A method for preparing a poly(phenylene ether) includes feeding an oxygen-containing gas phase to a continuous flow reactor that contains a reaction mixture comprising a phenol, a transition metal catalyst, and an organic solvent; and oxidatively polymerizing the reaction mixture at a temperature of 20 to 50° C., preferably 25 to 40° C., more preferably 30 to 35° C., to form a poly(phenylene ether); wherein the reaction mixture has a residence time of less than or equal to 30 minutes, preferably 5 to 20 minutes in the continuous flow reactor; and wherein the reaction mixture comprises less than 500 ppm of dissolved transition metal catalyst, preferably less than 250 ppm of dissolved transition metal catalyst, more preferably 100 to 225 ppm of dissolved transition metal catalyst, based on the total weight of the reaction mixture.

Another embodiment is a poly(phenylene ether) made by the method.

Another embodiment is an article comprising the poly(phenylene ether).

Another embodiment is a method for the analysis of a poly(phenylene ether) reaction mixture, the method comprising: introducing a sample of a reaction mixture comprising a phenol and a poly(phenylene ether) into an infrared spectroscopy system to produce first signal for quantifying the amount of phenol, the molecular weight of the poly(phenylene ether), or both, and comparing the first signal to a calibration curve generated from a plurality of signals from standards of known phenol concentration, poly(phenylene ether) molecular weight, or both, to determine the amount of phenol in the reaction mixture, the molecular weight of the poly(phenylene ether), or both.

The above described and other features are exemplified by the following figures and detailed description.

BRIEF DESCRIPTION OF THE DRAWINGS

The following figures are exemplary embodiments.

DETAILED DESCRIPTION

The present inventors have advantageously discovered a process for preparing poly(phenylene ether) using a single continuous flow reactor with short residence times (e.g., ≤30 minutes) and low metal catalyst concentrations. Continuous processes can offer advantages such as lower operating costs compared to batch production. Use of a single reactor is economical in terms of equipment purchase, warehousing, maintenance, and personnel required to run the reactor. The resulting poly(phenylene ether)s can advantageously exhibit high molecular weights and narrow molecular weight distributions. The present inventors have further advantageously discovered a process for analysis of the poly(phenylene ether) polymerization reaction mixture using infrared (IR) spectroscopy. The IR-based method is fast, and can be used to quantify monomer concentration and polymer molecular weight.

Accordingly, an aspect is a method for preparing a poly(phenylene ether). The method comprises, in an embodiment, feeding a reaction mixture to a single continuous flow reactor. The components of the reaction mixture can be precombined or fed into the reactor separately to provide the reaction mixture in the reactor. The continuous flow reactor preferably allows for intense heat and mass transfer between multiple phases while offering limited back mixing of individual phases in the flow direction. The volumetric mass transfer coefficients are preferably in excess of 0.1 $s^{-1}$, for example, 0.1 to 5 $s^{-1}$. Heat transfer per unit volume is preferably greater than 500 $m^{-1}$. Examples of suitable continuous flow reactors that can produce poly(phenylene ether) in a single reactor can include, but are not limited to, microreactors and millireactors. The continuous flow reactor can be a commercially available flow reactor, for example, Advanced-Flow™ Reactor from Corning Inc.; Modular MicroReaction System, Lonza FlowPlate™ ART™ plate reactors and Miprowa™ from Ehrfeld Mikrotechnik BTS GmbH; Qmix™ microreaction system from Cetoni; LAB-TRIX™ START, LABTRIX™ 51, KILOFLOW™ and PLANTRIX™ from Chemtrix; HTM™, MR-LAB™, MR PILOT™ and XXL™ SERIES from Little Things Factory; Asia™ Flow Chemistry System from Syrris; KeyChem™, CYTOS-200™ and CYTOS-2000™ from YMC, AMaR-2™ and AMaR-4P™ from AMAR Equipments Pvt Ltd. The inner diameter of the flow reactor is not limited to any specific value. In a specific, non-limiting example, an exemplary inner diameter of a reactor can be 0.01 to 10 mm, or 0.05 to 8 mm, or 0.1 to 5 mm. The flow reactor can have a single passage, parallel passages, or serial passages.

The reaction mixture comprises a phenol, a transition metal catalyst, and an organic solvent. The phenol can be a monohydric phenol having the structure wherein each occurrence of $Q^1$ is independently halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and wherein each occurrence of $Q^2$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms. In some embodiments, each occurrence of $Q^1$ is methyl and each occurrence of $Q^2$ is hydrogen and the phenol is 2,6-xylenol (also referred to as dimethyl phenol). In some embodiments, each occurrence of $Q^1$ is methyl, one occurrence of $Q^2$ is hydrogen and the other is methyl, and the phenol is 2,3,6-trimethylphenol.

Suitable transition metal catalysts for the synthesis of poly(phenylene ether) include those comprising such catalyst metals as manganese, chromium, copper, and combinations thereof. Among metal complex catalysts, it is preferred to use a copper complex catalyst comprising a secondary alkylene diamine ligand. The copper source for the copper complex comprising a secondary alkylene diamine can comprise a salt of cupric or cuprous ion, including halides, oxides, and carbonates. Alternatively, copper can be provided in the form of a pre-formed salt of the alkylene diamine ligand. Preferred copper salts include cuprous halides, cupric halides, and their combinations. Especially preferred are cuprous bromides, cupric bromides, and combinations thereof.

The reaction mixture comprises less than 500 parts per million (ppm) of dissolved transition metal catalyst, preferably less than 250 ppm of dissolved transition metal catalyst, more preferably 100 to 225 ppm of dissolved transition metal catalyst, based on the total weight of the reaction mixture. The amount of dissolved transition metal catalyst can be determined, for example, using inductively coupled plasma (ICP) analysis for trace metals. Prior to entering the flow reactor, the reaction mixture can be filtered to remove undissolved metal catalyst.

A preferred copper complex catalyst comprises a secondary alkylene diamine ligand. Suitable secondary alkylene diamine ligands are described in U.S. Pat. No. 4,028,341 to Hay and are represented by the formula wherein $R^a$ is a substituted or unsubstituted divalent residue wherein two or three aliphatic carbon atoms form the closest link between the two diamine nitrogen atoms; and $R^b$ and $R^c$ are each independently isopropyl or a substituted or unsubstituted $C_{4-8}$ tertiary alkyl group. Examples of $R^a$ include ethylene, 1,2-propylene, 1,3-propylene, 1,2-butylene, 1,3-butylene, 2,3-butylene, the various pentylene isomers having from two to three carbon atoms separating the two free valances, phenylethylene, tolylethylene, 2-phenyl-1,2-propylene, cyclohexylethylene, 1,2-cyclohexylene, 1,3-cyclohexylene, 1,2-cyclopropylene, 1,2-cyclobutylene, 1,2-cyclopentylene, and the like. Preferably, $R^a$ is ethylene. Examples of $R^b$ and $R^c$ can include isopropyl, t-butyl, 2-methyl-but-2-yl, 2-methyl-pent-2-yl, 3-methyl-pent-3-yl, 2,3-dimethyl-buty-2-yl, 2,3-dimethylpent-2-yl, 2,4-dimethyl-pent-2-yl, 1-methylcyclopentyl, 1-methylcyclohexyl and the like. A highly preferred example of $R^b$ and $R^c$ is t-butyl. An exemplary secondary alkylene diamine ligand is N,N'-di-t-butylethylenediamine (DBEDA). Suitable molar ratios of copper to secondary alkylene diamine are from 1:1 to 1:5, preferably 1:1 to 1:3, more preferably 1:1.5 to 1:2.

The preferred copper complex catalyst comprising a secondary alkylene diamine ligand can further comprise a secondary monoamine. Suitable secondary monoamine ligands are described in commonly assigned U.S. Pat. No. 4,092,294 to Bennett et al. and represented by the formula wherein $R^d$ and $R^e$ are each independently substituted or unsubstituted $C_{1-12}$ alkyl groups, and preferably substituted or unsubstituted $C_{3-6}$ alkyl groups. Examples of the secondary monoamine include di-n-propylamine, di-isopropylamine, di-n-butylamine, di-sec-butylamine, di-t-butylamine, N-isopropyl-t-butylamine, N-sec-butyl-t-butylamine, di-n-pentylamine, bis(1,1-dimethylpropyl)amine, and the like. A highly preferred secondary monoamine is di-n-butylamine (DBA). A suitable molar ratio of copper to secondary monoamine is from 1:1 to 1:10, preferably 1:3 to 1:8, and more preferably 1:4 to 1:7.

The preferred copper complex catalyst comprising a secondary alkylene diamine ligand can further comprise a tertiary monoamine. Suitable tertiary monoamine ligands are described in the abovementioned Hay U.S. Pat. No. 4,028,341 and Bennett U.S. Pat. No. 4,092,294 patents and include heterocyclic amines and certain trialkyl amines characterized by having the amine nitrogen attached to at least two groups which have a small cross-sectional area. In the case of trialkylamines, it is preferred that at least two of the alkyl groups be methyl with the third being a primary $C_{1-8}$ alkyl group or a secondary $C_{3-8}$ alkyl group. It is especially preferred that the third substituent have no more than four carbon atoms. A highly preferred tertiary amine is dimethylbutylamine (DMBA). A suitable molar ratio of copper to tertiary amine is less than 1:20, preferably less than 1:15, preferably 1:1 to less than 1:15, more preferably 1:1 to 1:12.

A suitable molar ratio of metal complex catalyst (measured as moles of metal) to phenol is 1:50 to 1:400, preferably 1:100 to 1:200, more preferably 1:100 to 1:180.

The reaction conducted in the presence of a metal complex catalyst can optionally be conducted in the presence of bromide ion. It has already been mentioned that bromide ion can be supplied as a cuprous bromide or cupric bromide salt. Bromide ion can also be supplied by addition of a 4-bromophenol, such as 2,6-dimethyl-4-bromophenol. Additional bromide ion can be supplied in the form of hydrobromic acid, an alkali metal bromide, or an alkaline earth metal bromide. Sodium bromide and hydrobromic acid are highly preferred bromide sources. A suitable ratio of bromide ion to copper ion is 2 to 20, preferably 3 to 20, more preferably 4 to 7.

The reaction mixture further comprises an organic solvent. Suitable organic solvents include alcohols, ketones, aliphatic and aromatic hydrocarbons, chlorohydrocarbons, nitrohydrocarbons, ethers, esters, amides, mixed ether-esters, sulfoxides, and the like, providing they do not interfere with or enter into the oxidation reaction. Preferably, the solvent is selected so as to avoid any precipitation in the reactor. The organic solvent can comprise, for example, toluene, benzene, chlorobenzene, ortho-dichlorobenzene, nitrobenzene, trichloroethylene, ethylene dichloride, dichloromethane, chloroform, or a combination thereof. Preferred solvents include aromatic hydrocarbons. In some embodiments, the organic solvent comprises toluene.

A suitable starting concentration of phenol can be 5 to 35 weight percent, or 5 to 15 weight percent, preferably 5 to 10 weight percent, more preferably 6 to 10 weight percent, or 15 to 35 weight percent, or 20 to 32 weight percent, based on the total weight of the phenol and solvent. All the phenol can be added at the beginning of the reaction. Alternatively, the phenol can be added in discrete or continuous amounts during the course of the reaction.

The reaction mixture can optionally further comprise one or more additional components, including a lower alkanol or glycol, a small amount of water, or a phase transfer agent. It is generally not necessary to remove reaction byproduct water during the course of the reaction. Suitable phase transfer agents can include, for example, a quaternary ammonium compound, a quaternary phosphonium compound, a tertiary sulfonium compound, or a combination thereof. Preferably, the phase transfer agent can be of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br$^-$, a $C_{1-8}$ alkoxy or a $C_{6-18}$ aryloxy. An effective amount of a phase transfer agent can be 0.1 to 10 wt %, or 0.5 to 2 wt %, each based on the weight of the reaction mixture. In a specific embodiment, a phase transfer agent is present and comprises N,N,N'N'-didecyldimethyl ammonium chloride.

In some embodiments, the reaction mixture can optionally further comprise a dihydric phenol, preferably 2,2',6,6'-tetramethylbisphenol A. When present, the dihydric phenol can be included in the reaction mixture in an amount of 1 to 20 weight percent, or 1 to 10 weight percent, based on the total weight of the reaction mixture.

The method further comprises feeding an oxygen-containing gas phase to the continuous flow reactor. Oxygen can be introduced the flow reactor in pure form or diluted with an inert gas such as nitrogen, helium, argon, and the like. Air can be used as an oxygen source. Feeding the oxygen-containing gas phase can be at a flow rate effective to provide an oxygen:phenol molar ratio of 1:1 to 1:1.2, preferably 1:1.1.

Upon feeding the reaction mixture and the oxygen-containing gas phase to the continuous flow reactor, the reaction mixture can be oxidatively polymerized to form the desired poly(phenylene ether). The polymerization can be conducted at a temperature of 20 to 50° C., preferably 25 to 40° C., more preferably 30 to 35° C. Advantageously, the reaction mixture can have a residence time of less than or equal to 30 minutes, or less than or equal to 15 minutes, preferably 5 to 20 minutes in the continuous flow reactor. The reaction can be terminated by stopping the oxygen addition when the target intrinsic viscosity is reached. Other suitable methods for terminating the reaction include the addition of a mineral or organic acid, such as acetic acid, or the addition of a sequestrant as described in greater detail below.

The method can further comprise recovering the copper catalyst using an aqueous sequestrant solution. Suitable techniques for recovering the catalyst metal from the metal complex catalyst include those described in commonly assigned U.S. Pat. No. 3,838,102 to Bennett et al., U.S. Pat. No. 3,951,917 to Floryan et al., and U.S. Pat. No. 4,039,510 to Cooper et al. These techniques comprise the addition of one or more sequestrants to complex the catalyst metal and facilitate its separation from the poly(phenylene ether) product. A preferred method for removing catalyst metal from the poly(phenylene ether) product is described in U.S. application Ser. No. 09/616,737. This method, which eliminates multiple rinses with a complexing reagent, includes removing the catalyst from the polymerization mixture by mixing the polymerization mixture with a complexing reagent and liquid/liquid centrifuging the multiphase mixture. Water is then added to the polymer phase prior to a subsequent liquid/liquid centrifuge process. In general, suitable sequestrants include polyfunctional carboxylic acid-containing compounds, such as citric acid, tartaric acid, nitrilotriacetic acid, ethylenediaminetetraacetic acid, ethylenediaminedisuccinic acid, hydroxyethylethylenediaminetriacetic acid, diethylenetriaminepentaacetic acid, and the like. These sequestrants can be used as their free acids or salts of, for example, their alkali metals, alkaline earth metals, and nitrogenous cations. Preferred sequestrants include nitrilotriacetic acid, ethylenediamine tetraacetic acid and their salts. Suitable molar ratios of sequestrant to catalyst metal are 1:1 to 5:1, preferably 1.1:1 to 3:1, more preferably 1:1.5 to 1:2.5.

The method further comprises isolating the poly(phenylene ether) by precipitation. Precipitation of the poly(phenylene ether) can be induced by appropriate selection of reaction solvent described above, or by the addition of an anti-solvent to the reaction mixture. Suitable anti-solvents include lower alkanols having one to about ten carbon atoms, acetone, and hexane. The preferred anti-solvent is methanol. The anti-solvent can be employed at a range of concentrations relative to the organic solvent, with the optimum concentration depending on the identities of the organic solvent and anti-solvent, as well as the concentration and intrinsic viscosity of the poly(phenylene ether) product. It has been discovered that when the organic solvent is toluene and the anti-solvent is methanol, a toluene:methanol weight ratio of 50:50 to 80:20 is suitable, with ratios of 60:40 to 70:30 being preferred, and 63:37 to 67:33 being more preferred. These preferred and more preferred ratios are useful for producing a desirable powder morphology for the isolated poly(phenylene ether) resin, without generating either stringy powder or excessive powder fines.

The method can optionally comprise pre-concentrating the reaction mixture prior to addition of the anti-solvent. Although it is not possible to pre-concentrate to as great a degree as for lower intrinsic viscosity poly(phenylene ether)s, pre-concentrations of, for example, 15 weight percent poly(phenylene ether) are possible. Any suitable method for pre-concentration can be employed. For example, the pre-concentration can be carried out by preheating the solution above its atmospheric boiling point at a pressure modestly elevated above one atmosphere (so that no boiling takes place in the heat exchanger) followed by flashing the solution to a lower pressure and temperature, whereby vaporization of a substantial part of the toluene takes place and the required heat of vaporization is supplied by the heat transferred in the heat exchanger as sensible heat of the solution.

The isolated poly(phenylene ether) can have an intrinsic viscosity of greater than or equal to 0.04 to 2 deciliters per gram, preferably 0.8 to 2 deciliters per gram, more preferably 1.0 to 2 deciliters per gram, even more preferably 1.2 to 2 deciliters per gram, or 1.0 to 1.6 deciliters per gram as measured in chloroform at 25° C. using an Ubbelohde viscometer.

The isolated poly(phenylene ether) can also have a dispersity of less than 3, for example 1.2 to 2.9, or 1.5 to 2.9, or 1.5 to 2.7.

In some embodiments, the poly(phenylene ether) prepared according to the method described herein can advantageously have an amine content of less than 1 weight percent, preferably less than 0.5 weight percent, more preferably less than 0.35 weight percent.

Thus, the poly(phenylene ether) prepared according to the above method represents another aspect of the present disclosure. The poly(phenylene ether) can comprise repeating structural units having the formula wherein each occurrence of $Q^1$ and $Q^2$ are as defined above. The hydrocarbyl residue can also contain one or more carbonyl groups, amino groups, hydroxyl groups, or the like, or it can contain heteroatoms within the backbone of the hydrocarbyl residue. As one example, $Q^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. In some embodiments, the poly(phenylene ether) is substantially free of the quinone end groups. For example, the poly(phenylene ether) can include less than 1% of quinone end groups. The poly(phenylene ether) can be in the form of a homopolymer, a copolymer, a graft copolymer, an ionomer, or a block copolymer, as well as combinations thereof.

Compositions and articles comprising the poly(phenylene ether) made by the above method represent another aspect of the present disclosure. For example, the poly(phenylene ether) made by the method described herein can be useful for forming a thermoplastic composition which can optionally comprises at least one of a thermoplastic polymer different from the poly(phenylene ether) and an additive composition comprising one or more additives.

The poly(phenylene ether) can be formed into articles by shaping, extruding, or molding. Articles can be molded from the composition by methods including, for example, injection molding, injection compression molding, gas assist injection molding, rotary molding, blow molding, compression molding, and the like. In some embodiments, articles can be formed by injection molding.

It can be further advantageous to monitor the polymerization reaction to prepare poly(phenylene ether) instantaneously to estimate conversion, monomer depletion, and molecular weight build up. The present inventors have advantageously discovered that polymerization of poly(phenylene ether) can be measured using infrared (IR) spectroscopy. The IR method can be particularly advantageous for determining monomer conversion to polymer and estimating molecular weight of the polymer. Thus, another aspect is a method for monitoring the polymerization of phenylene ether. In particular, at least a portion of a reaction mixture from an outlet from the flow reactor can be diverted to an IR monitoring device, for example a micro attenuated total reflection (ATR) IR flow cell, which can analyze the composition of the reaction mixture and the polymer molecular weight, preferably within a time of less than or equal to 30 seconds, preferably less than or equal to 15 seconds. The reaction mixture can be diluted with solvent if needed, for example to analyze viscous reaction mixtures (e.g., containing high molecular weight polymer). Alternatively, the reaction mixture from the outlet of the reactor can be collected in a reservoir and an infrared probe can be inserted into the reaction mixture for analysis. Advantageously, this method to monitor the reaction can be done with no prior sample preparation and can be completed quickly (i.e., less than 15 seconds for analysis to be completed).

The present inventors have therefore discovered an improved method for the preparation of poly(phenylene ether) using a single continuous flow reactor. The method described herein can provide poly(phenylene ether)s having high intrinsic viscosity and narrow polydispersity index with significantly reduced reaction times. Therefore, a substantial improvement in the preparation of poly(phenylene ether) is provided by the present disclosure.

This disclosure is further illustrated by the following examples, which are non-limiting.

EXAMPLES

Materials used for the following Examples are described in Table 1.

TABLE 1

| Component | Description | Supplier |
|---|---|---|
| DMP | 2,6-Dimethylphenol, CAS Reg. No. 576-26-1 | Sigma Aldrich |
| TMBPA | 2,2',6,6'-Tetramethyl Bisphenol A, CAS Reg. No. 5613-46-7 | Deepak Novochem |
| $Cu_2O$ | Cuprous oxide, CAS Reg. No. 1317-39-1 | Sigma Aldrich |
| HBr | Hydrobromic acid, 48 wt. % aqueous solution; CAS Reg. No. 10035-10-6 | Sigma Aldrich |
| DBEDA | Di-tert-butylethylenediamine, CAS Reg. No. 4062-60-6 | Sigma Aldrich |
| DBA | Di-n-butylamine, CAS Reg. No. 111-92-2 | Sigma Aldrich |
| DMBA | N,N-Dimethylbutylamine, CAS Reg. No. 927-62-8 | Sigma Aldrich |
| DDAC | N,N,N'N'-Didecyldimethyl ammonium chloride, CAS Reg. No. 7173-51-5, available under the tradename MAQUAT 4450T | Pilot Chemical Company |
| NTA | Nitrilotriacetic acid trisodium salt, CAS Reg. No. 5064-31-3 | Sigma Aldrich |
| Methanol | Methanol, CAS Reg. No. 67-56-1 | Merck |
| Toluene | Toluene, CAS Reg. No. 108-88-3 | Sigma Aldrich |

The reaction mixture used for comparative example 1 and example 1 was prepared according to the composition described in Table 2. The amount of each component is given in weight percent based on the total weight of the feed composition. The components were stirred well to ensure dissolution of the copper catalyst compound, and the resulting mixture was filtered to remove undissolved copper. The reaction mixture was charged to the feed vessel in the below examples.

TABLE 2

| Component | Concentration in feed (wt %) |
|---|---|
| DMP | 6.0 |
| Cu$_2$O/HBr[1] | 0.5 |
| DBA | 0.3 |
| DMBA | 0.9 |
| Diamine mix[2] | 0.6 |
| Toluene | 91.7 |

[1]weight ratio of Cu$_2$O: HBr (48% aqueous w/w) of 1.00:11.5;
[2]Diamine mix includes 0.2329 grams DBEDA, 0.1242 grams DDAC, and 0.4193 grams toluene Comparative Example 1

A batch polymerization was conducted in a single reactor using the above reaction mixture as a comparative example. The conditions for the batch procedure are provided in Table 3.

TABLE 3

| Step | Time | Temperature |
|---|---|---|
| While charging | — | 28° C. |
| Monomer charge | 0 or 40 minutes | 38° C. |
| MW Build | 60 minutes | 48° C. |
| Cu quench | 15 minutes | 48 to 60° C. |
| Mw Redistribution | 60 minutes | 60° C. |

Results of the batch polymerization are summarized in Table 4. Number average molecular weight (Mn), weight average molecular weight (Mw), and PDI were determined by gel permeation chromatography in chloroform relative to polystyrene standards. Mn and Mw are given in grams per mole (g/mol). These results are also summarized in FIG. 1.

TABLE 4

Figure 1:
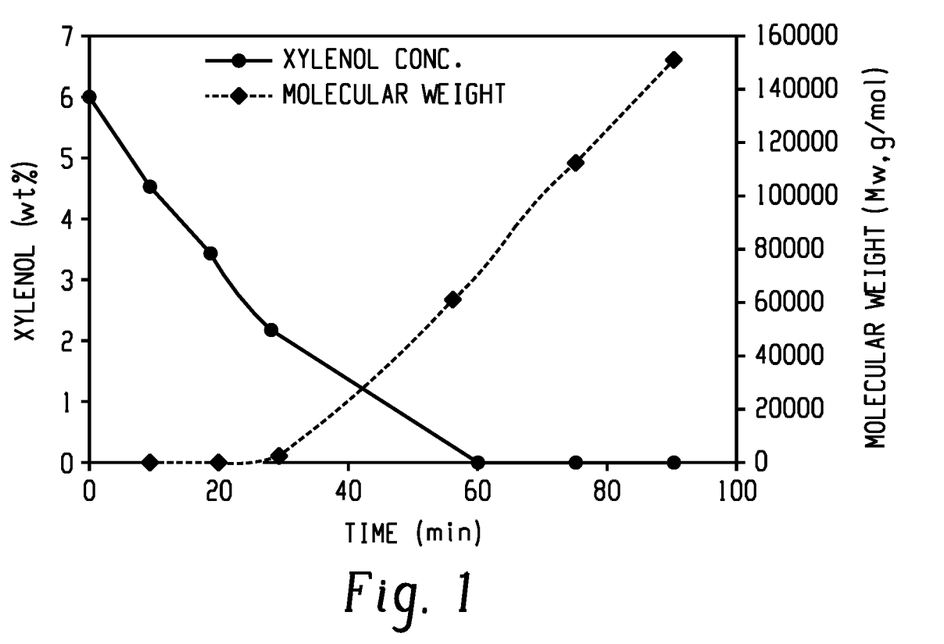
FIG. 1 shows the decrease in xylenol content and increase in molecular weight over time during a batch polymerization.

| Batch Time (mins) | Xylenol (wt %) | Mn (g/mol) | Mw (g/mol) | PDI | IV |
|---|---|---|---|---|---|
| 0 | 5.9 | — | — | — | — |
| 10 | 4.5 | — | — | — | — |
| 20 | 3.4 | — | — | — | — |
| 30 | 2.2 | 998 | 1697 | 1.7 | — |
| 60 | ND | 11654 | 60484 | 5.19 | — |
| 75 | ND | 20527 | 112487 | 5.48 | — |
| 90 | ND | 18369 | 150627 | 8.2 | 1.27 |

"ND" means "non-detectable," which is defined as a concentration of less than 10 parts per million (ppm).

Example 1

An Advanced Flow Reactor AFR, available from Corning, was used to conduct the following example. The flow reactor used is a reactor in plate form, where there are multiple plates arranged in series to provide for sufficient reactor volume. The feed composition described above (as a liquid phase) and oxygen (as a gas phase) flow co-currently through the reactor. The reaction mixture is pumped at a predetermined flow rate through the reactor. Once the reactor was filled with the liquid, the reactor was heated to 30° C. by passing hot liquid through the heat transfer plates that surround the reactor. At the exit of the reactor, the liquid phase was collected, and the polymer was recovered and isolated to provide the desired poly(phenylene ether).

The flow reactor process conditions and parameters are given in Table 5. The reaction was conducted in a single reactor.

TABLE 5

| Parameter | Set point |
|---|---|
| Reactor volume | 64 milliliters (8 modules) |
| Liquid feed | All mixed together |
| Copper (dissolved)* | 180 to 200 ppm |
| Liquid flow rate | 8 to 20 milliliters per minute, preferably 8.5 milliliters per minute |
| Residence time | 3 to 10 minutes |
| Oxygen flow rate | 45 to 115 milliliters per minute |
| Temperature | 30 to 35° C., preferably 30° C. |

*Copper fed to reaction is only dissolved copper, which is measured to be about 200 ppm. Dissolved copper can be measured by inductively coupled plasma (ICP) analysis for trace metals.

Figure 2:
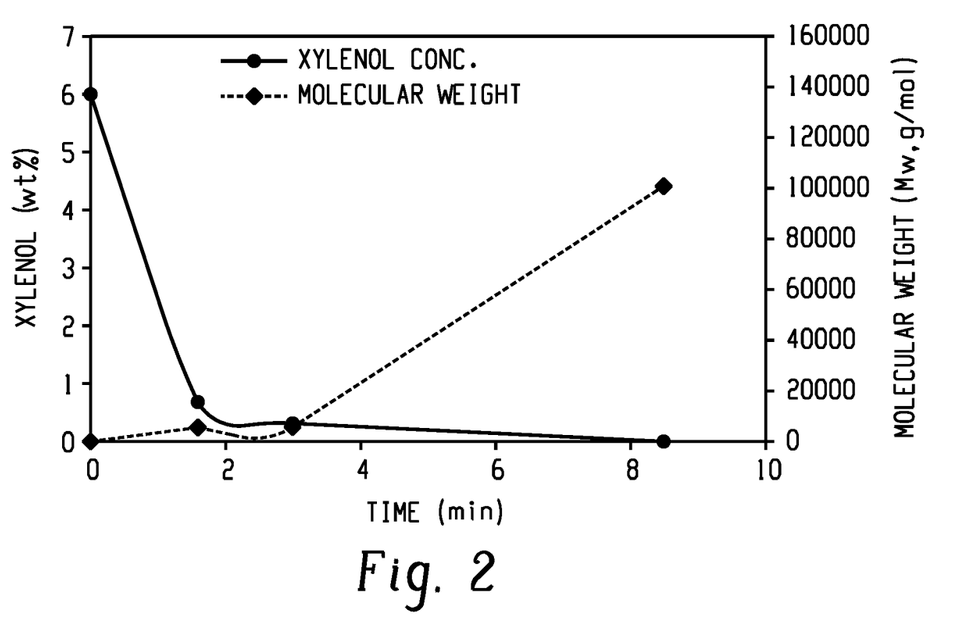
FIG. 2 shows the decrease in xylenol content and increase in molecular weight over time during a continuous polymerization in a flow reactor.

Results of the continuous reaction in the flow reactor are summarized in Table 6 and shown in FIG. 2. Number average molecular weight (Mn), weight average molecular weight (Mw), and PDI were determined by gel permeation chromatography in chloroform relative to polystyrene standards. Mn and Mw are given in grams per mole (g/mol).

TABLE 6

| Residence Time (mins) | Xylenol (wt %) | Mn (g/mol) | Mw (g/mol) | PDI | IV |
|---|---|---|---|---|---|
| 0 | 6.0 | — | — | — | — |
| 1.6 | 0.9 | 2695 | 4663 | 1.73 | — |
| 3 | 0.4 | 3641 | 5934 | 1.63 | — |
| 7.7 | ND | 38369 | 78657 | 2.05 | — |
| 8.2 | ND | 43730 | 100583 | 2.3 | — |
| 10 | ND | 45671 | 122400 | 2.68 | 1.57 |

"ND" means "non-detectable," which is defined as a concentration of less than 10 parts per million (ppm).

As can be seen from comparative example 1 and example 1, the reaction times are 10 to 12 times faster when a flow reactor is used.

The polymer prepared by the batch process and the flow reactor process were further analyzed and the results are provided in Table 7. Molecular weight reported in Table 7 is given in g/mol and is the weight average (Mw) molecular weight of the final polymer after chelation and isolation. Terminal and internal DBA refers to the weight percent of 3-methyl-4-hydroxy-5-di-n-butylaminomethylphenyl groups incorporated into the polymer, and can be determined by proton nuclear magnetic resonance ($^1$H NMR) spectroscopy. Intrinsic viscosity (IV) was determined in chloroform at 25° C. using an Ubbelohde viscometer, and is reported in deciliter per gram (dl/g).

TABLE 7

| Sample | MW (g/mol) | Terminal DBA (wt %) | Internal DBA (wt %) | IV (dl/g) |
|---|---|---|---|---|
| PPE-Batch 1 | 112487 | 0.19 | 0.38 | 1.266 |
| PPE-Batch 2 | 130820 | 0.08 | 0.45 | 1.243 |
| PPE from flow reactor | 102017 | 0.32 | 0.17 | 1.573 |

Preparation of PPE Copolymers

The preparation of PPE using DMP and a comonomer and high monomer concentration was also explored, wherein the preparation was conducted a single reactor. The feed compositions used for the batch process (comparative example 2) and a continuous flow process (example 2) are provided in Table 8. The amount of each component is provided in weight percent based on the total weight of the feed composition.

TABLE 8

| Component | Comparative Example 2 | Example 2 |
|---|---|---|
| DMP | 24.50 | 24.13 |
| $Cu_2O$ | 0.02 | 0.02 |
| HBr | 0.23 | 0.23 |
| DMBA | 0.69 | 0.69 |
| DBA | 0.36 | 0.36 |
| Diamine mix[1] | 0.18 | 0.17 |
| TMBPA | 5.15 | 5.18 |
| Toluene | 68.88 | 69.22 |

Figure 3:
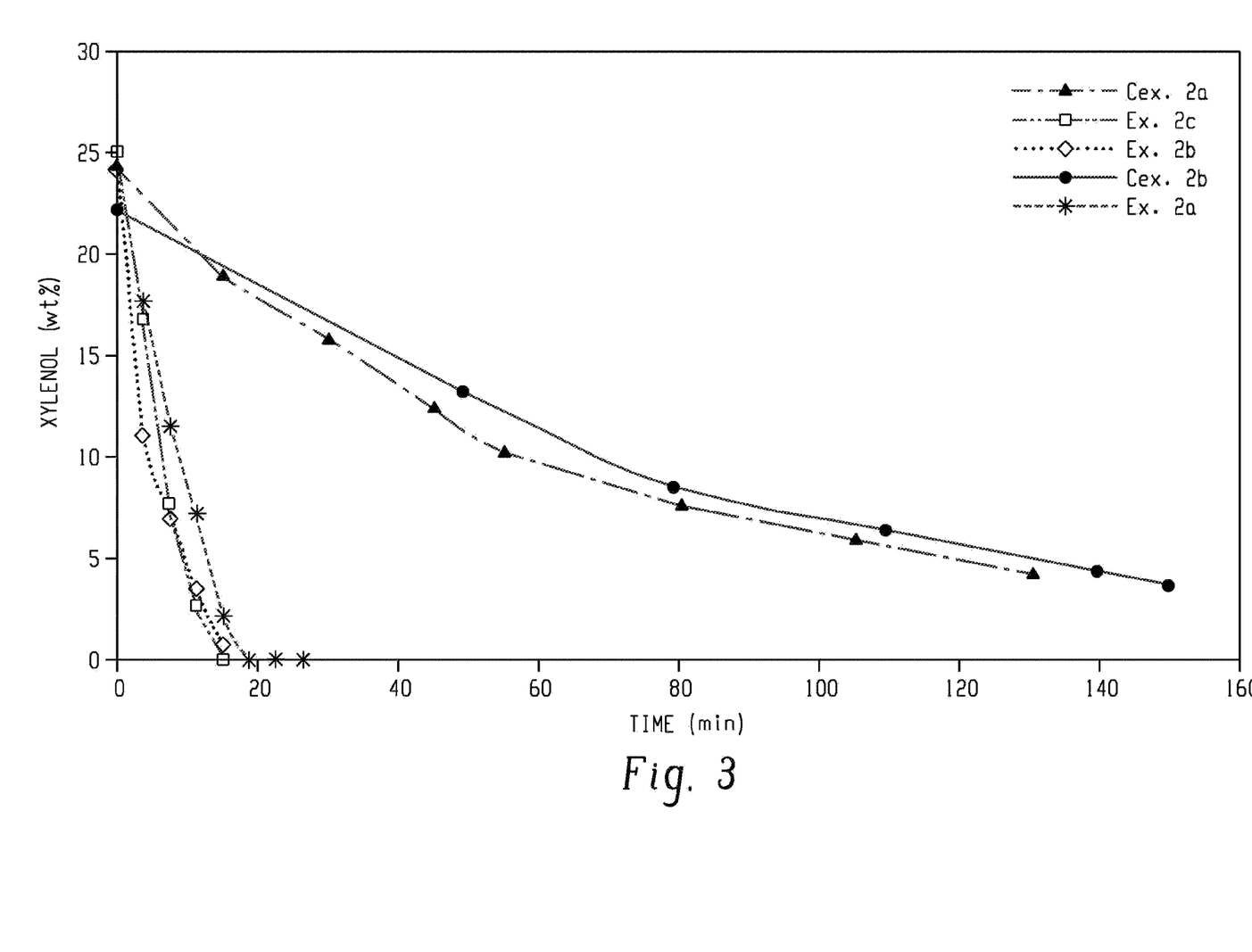
FIG. 3 shows concentration of xylenol over time during a copolymerization in a batch and a flow reactor.

[1]Diamine mix includes 0.2329 grams DBEDA, 0.1242 grams DDAC, and 0.4193 grams toluene Three trials with the continuous flow reactor were conducted (Ex. 2a-2c) and two trials with the batch process were conducted (CEx. 2a-2b). The results are shown in Table 9 and FIG. 3. As can be seen from FIG. 3, the polymerization using the flow reactor can be completed in less time (about 20 minutes) compared to the batch process (more than 2 hours for about 95 percent conversion of DMP to polymer).

TABLE 9

| Example | Time (min) | Xylenol (wt %) |
|---|---|---|
| Ex. 2a | 0 | 25 |
|  | 4 | 17 |
|  | 8 | 12 |
|  | 11 | 7 |
|  | 15 | 2 |
| Ex. 2b | 0 | 25 |
|  | 4 | 11 |
|  | 8 | 7 |
|  | 11 | 3 |
|  | 15 | 1 |
| Ex. 2c | 0 | 25 |
|  | 4 | 17 |
|  | 8 | 8 |
|  | 11 | 3 |
|  | 15 | ND |
| CEx. 2a | 0 | 24 |
|  | 15 | 19 |
|  | 30 | 16 |
|  | 45 | 12 |
|  | 55 | 10 |
|  | 80 | 8 |
|  | 105 | 6 |
|  | 130 | 4 |
| Cex. 2b | 0 | 22 |
|  | 49 | 13 |
|  | 79 | 9 |
|  | 109 | 6 |
|  | 139 | 4 |
|  | 149 | 4 |

"ND" means "non-detectable," which is defined as a concentration of less than 10 parts per million (ppm).

Monitoring Poly(Phenylene Ether) Polymerization Using Online Infrared Spectroscopy A Mettler Toledo ReactIR™ 45m with fibre optic probe and Dicomp ATR crystal and a Mettler Toledo ReactIR™ 45m with micro flow cell and diamond ATR crystal were used. The procedure for infrared (IR) analysis was as follows. A sample obtained from an experiment was run through an AFR unit and was measured using the probe. The reaction sample was also analyzed by HPLC for 2,6-xylenol content and by GPC for the molecular weight. Various concentrations of 2,6-xylenol were tested to obtain a wide calibration range from 0 to 25 weight percent of 2,6-xylenol and a molecular weight of poly(phenylene ether) of from 1,000 to 1,000,000 grams per mole. For 2,6-xylenol, the range of 1350 to 1200 cm' was analyzed to observe the maximum peak height at 1260 $cm^{-1}$. This value was plotted as a linear regression with the obtained HPLC data to construct a calibration curve. Similarly, a multivariate regression was constructed with the molecular weight data. The root mean square value obtained for the calibration curve was 0.00346 and the $R^2$ value was 0.989.

This disclosure further encompasses the following aspects.

Aspect 1: A method for preparing a poly(phenylene ether), the method comprising: feeding an oxygen-containing gas phase to a continuous flow reactor that contains a reaction mixture comprising a phenol, a transition metal catalyst, and an organic solvent; and oxidatively polymerizing the reaction mixture at a temperature of 20 to 50° C., preferably 25 to 40° C., more preferably 30 to 35° C., to form a poly(phenylene ether); wherein the reaction mixture has a residence time of less than or equal to 30 minutes, preferably 5 to 20 minutes in the continuous flow reactor; and wherein the reaction mixture comprises less than 500 ppm of dissolved transition metal catalyst, preferably less than 250 ppm of dissolved transition metal catalyst, more preferably 100 to 225 ppm of dissolved transition metal catalyst, based on the total weight of the reaction mixture.

Aspect 2: The method of aspect 1, wherein the continuous flow reactor is characterized by a volumetric mass transfer coefficient of 0.1 to 5 $sec^{-1}$.

Aspect 3: The method of any one of aspects 1 to 2, wherein the phenol comprises 2,6-dimethylphenol.

Aspect 4: The method of any one of aspects 1 to 3, wherein the transition metal catalyst is a copper-amine catalyst, preferably comprising a copper ion and a hindered secondary amine, preferably wherein the hindered secondary amine has the formula $R_b HN—R_a—NH—R_c$ wherein $R_a$ is $C_{2-4}$ alkylene or $C_{3-7}$ cycloalkylene and $R_b$ and $R_c$ are isopropyl or $C_{4-8}$ tertiary alkyl wherein only the α-carbon atom has no hydrogen atoms, there being at least two and no more than three carbon atoms separating the two nitrogen atoms, more preferably wherein the hindered secondary amine is di-tert-butylethylenediamine.

Aspect 5: The method of any one of aspects 1 to 4, wherein the organic solvent comprises toluene, benzene, chlorobenzene, ortho-dichlorobenzene, nitrobenzene, trichloroethylene, ethylene dichloride, dichloromethane, chloroform, or a combination thereof.

Aspect 6: The method of any one or more of aspects 1 to 5, wherein the reaction mixture further comprises a dihydric phenol, preferably 2,2',6,6'-tetramethylbisphenol A.

Aspect 7: The method of any one of aspects 1 to 6, wherein the reaction mixture further comprises one or more of a secondary monoamine, a tertiary monoamine, or a combination thereof, preferably wherein the secondary monoamine comprises di-n-butylamine and the tertiary monoamine comprises N,N-dimethylbutylamine; a bromide ion source, preferably hydrobromic acid; and a phase transfer agent, preferably wherein the phase transfer agent comprises a quaternary ammonium compound, a quaternary phosphonium compound, a tertiary sulfonium compound, or a combination thereof, more preferably wherein the phase transfer agent comprises N,N,N'N'-didecyldimethyl ammonium chloride.

Aspect 8: The method of any one of aspects 1 to 7, wherein feeding the oxygen-containing gas phase is at a flow rate effective to provide an oxygen:phenol molar ratio of 1:1 to 1:1.2, preferably 1:1.1; and the reaction mixture has a residence time of less than or equal to 15 minutes.

Aspect 9: The method of any one of aspects 1 to 8, further comprising isolating the poly(phenylene ether) from the reaction mixture.

Aspect 10: The method of any one of aspects 1 to 9, wherein the poly(phenylene ether) has an intrinsic viscosity of greater than or equal to 0.04 to 2 deciliter per gram, a polydispersity index of 1.5 to 2.9.

Aspect 11: The method of any one of aspects 1 to 10, wherein the poly(phenylene ether) has an amine content of less than 1 weight percent, preferably less than 0.5 weight percent, more preferably less than 0.35 weight percent.

Aspect 12: The method of any one of aspects 1 to 11, further comprising introducing at least a portion of the reaction mixture into an infrared spectroscopy system to produce first signal for quantifying the amount of phenol, the molecular weight of the poly(phenylene ether), or both, and comparing the first signal to a calibration curve generated from a plurality of signals from standards of known phenol concentration, poly(phenylene ether) molecular weight, or both, to determine the amount of phenol in the reaction mixture, the molecular weight of the poly(phenylene ether), or both.

Aspect 13: A poly(phenylene ether) made by the method of any one of aspects 1 to 12.

Aspect 14: An article comprising the poly(phenylene ether) of aspect 13.

Aspect 15: A method for the analysis of a poly(phenylene ether) reaction mixture, the method comprising: introducing a sample of a reaction mixture comprising a phenol and a poly(phenylene ether) into an infrared spectroscopy system to produce first signal for quantifying the amount of phenol, the molecular weight of the poly(phenylene ether), or both, and comparing the first signal to a calibration curve generated from a plurality of signals from standards of known phenol concentration, poly(phenylene ether) molecular weight, or both, to determine the amount of phenol in the reaction mixture, the molecular weight of the poly(phenylene ether), or both.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some aspects," "an aspect," and so forth, means that a particular element described in connection with the aspect is included in at least one aspect described herein, and may or may not be present in other aspect. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl," whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro (—$NO_2$), a cyano (—CN), a $C_{1-6}$ alkyl sulfonyl (—S(=O)$_2$-alkyl), a $C_{6-12}$ aryl sulfonyl (—S(=O)$_2$-aryl), a thiol (—SH), a thiocyano (—SCN), a tosyl ($CH_3C_6H_4SO_2$—), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example —$CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for preparing a poly(phenylene ether), the method comprising:
   feeding an oxygen-containing gas phase to a single continuous flow reactor that contains a reaction mixture comprising a phenol, a transition metal catalyst, and an organic solvent; and oxidatively polymerizing the reaction mixture at a temperature of 20 to 50° C., to form a poly(phenylene ether);
   wherein the reaction mixture has a residence time of less than or equal to 30 minutes in the single continuous flow reactor; and
   wherein the reaction mixture comprises less than 500 ppm of dissolved transition metal catalyst, based on the total weight of the reaction mixture;
   wherein the continuous flow reactor is a millireactor or a microreactor characterized by a volumetric mass transfer coefficient of 0.1 to 5 $sec^{-1}$.

2. The method of claim 1, wherein the continuous flow reactor is characterized by a heat transfer per unit volume of greater than 500 $m^{-1}$.

3. The method of claim 1, wherein the phenol comprises 2,6-dimethylphenol.

4. The method of claim 1, wherein the transition metal catalyst is a copper-amine catalyst.

5. The method of claim 1, wherein the organic solvent comprises toluene, benzene, chlorobenzene, ortho-dichlorobenzene, nitrobenzene, trichloroethylene, ethylene dichloride, dichloromethane, chloroform, or a combination thereof.

6. The method of claim 1, wherein the reaction mixture further comprises a dihydric phenol.

7. The method of claim 1, wherein the reaction mixture further comprises one or more of
   a secondary monoamine, a tertiary monoamine, or a combination thereof;
   a bromide ion source; and
   a phase transfer agent.

8. The method of claim 1, wherein
   feeding the oxygen-containing gas phase is at a flow rate effective to provide an oxygen:phenol molar ratio of 1:1 to 1:1.2; and
   the reaction mixture has a residence time of less than or equal to 15 minutes.

9. The method of claim 1, further comprising isolating the poly(phenylene ether) from the reaction mixture.

10. The method of claim 1, wherein the poly(phenylene ether) has an intrinsic viscosity of greater than or equal to 0.04 to 2 deciliter per gram, a polydispersity index of 1.5 to 2.9.

11. The method of claim 1, wherein the poly(phenylene ether) has an amine content of less than 1 weight percent.

12. The method of claim 1, further comprising introducing at least a portion of the reaction mixture into an infrared spectroscopy system to produce first signal for quantifying the amount of phenol, the molecular weight of the poly(phenylene ether), or both, and comparing the first signal to a calibration curve generated from a plurality of signals from standards of known phenol concentration, poly(phenylene ether) molecular weight, or both, to determine the amount of phenol in the reaction mixture, the molecular weight of the poly(phenylene ether), or both.

13. A poly(phenylene ether) made by the method of claim 1.

14. An article comprising the poly(phenylene ether) of claim 13.

15. A method for the analysis of a poly(phenylene ether) reaction mixture, the method comprising:
   introducing a sample of a reaction mixture comprising a phenol and a poly(phenylene ether) into an infrared spectroscopy system to produce first signal for quantifying the amount of phenol, the molecular weight of the poly(phenylene ether), or both, and
   comparing the first signal to a calibration curve generated from a plurality of signals from standards of known phenol concentration, poly(phenylene ether) molecular weight, or both, to determine the amount of phenol in the reaction mixture, the molecular weight of the poly(phenylene ether), or both.

16. The method of claim 15, wherein the reaction mixture obtained from a method for preparing a poly(phenylene ether) according to the method of claim 1.

* * * * *